United States Patent
Chang et al.

(10) Patent No.: US 7,502,230 B2
(45) Date of Patent: Mar. 10, 2009

(54) KEYBOARD, VIDEO AND MOUSE (KVM) SWITCH

(75) Inventors: Chih-Hsien Chang, Taipei Hsien (TW); Kevin Chen, Taipei Hsien (TW)

(73) Assignee: Aten International Co., Ltd., Taipei Hsien (TW)

( * ) Notice: Subject to any disclaimer, the term of this patent is extended or adjusted under 35 U.S.C. 154(b) by 32 days.

(21) Appl. No.: 11/561,012

(22) Filed: Nov. 17, 2006

(65) Prior Publication Data
US 2007/0086173 A1    Apr. 19, 2007

Related U.S. Application Data

(63) Continuation-in-part of application No. 11/317,632, filed on Dec. 22, 2005, which is a continuation-in-part of application No. 10/190,015, filed on Jul. 8, 2002, now Pat. No. 7,035,112.

(51) Int. Cl.
*H05K 5/00* (2006.01)

(52) U.S. Cl. ..................... 361/752; 361/800; 361/790

(58) Field of Classification Search ............... 361/752, 361/797, 800, 714, 795; 439/606, 736, 502, 439/505, 654, 264
See application file for complete search history.

(56) References Cited

U.S. PATENT DOCUMENTS

| | | |
|---|---|---|
| 2,667,553 A | 1/1954 | Moorhead et al. |
| 2,870,287 A | 1/1959 | Corbitt et al. |
| 4,103,252 A | 7/1978 | Bobick |
| 4,927,787 A | 5/1990 | Patel |
| 4,927,987 A | 5/1990 | Kirchgessner |
| 5,192,226 A | 3/1993 | Wang |
| 5,260,532 A | 11/1993 | Tinder et al. |
| 5,708,897 A | 1/1998 | Manabe et al. |
| 5,792,986 A | 8/1998 | Lee |
| 6,329,616 B1 | 12/2001 | Lee |
| 6,378,014 B1 | 4/2002 | Shirley |
| 6,449,866 B1 | 9/2002 | Murray |
| 6,498,890 B1 | 12/2002 | Kimminau |
| 6,521,836 B1 | 2/2003 | Simonazzi |
| 6,609,034 B1 | 8/2003 | Behrens et al. |
| 6,671,756 B1 | 12/2003 | Thomas et al. |
| 2001/0223141 | 9/2001 | Chang |
| 2001/0053627 A1 | 12/2001 | Armistead et al. |
| 2003/0223185 A1 | 12/2003 | Doczy et al. |

*Primary Examiner*—Hung S Bui
(74) *Attorney, Agent, or Firm*—Thomas, Kayden, Horstemeyer & Risley

(57) ABSTRACT

A keyboard, video and mouse (KVM) switch comprises an enclosure; a switching circuit contained within the enclosure; a set of connector ports disposed on the enclosure and electrically coupled to the switching circuit; a set of plugs electrically coupled to the switching circuit, the set of plugs comprising: a video plug disposed on the enclosure for directly coupling to a video port of a first computer system; and at least one peripheral plug attached to the enclosure for coupling to at least one peripheral port of the first computer system; and a cable connector electrically coupled to the switching circuit, for coupling to a second computer system via a detachable cable; wherein the switching circuit switches to operatively couple each connector port to the set of plugs and the cable connector.

22 Claims, 5 Drawing Sheets

KEYBOARD, VIDEO AND MOUSE (KVM) SWITCH

CROSS REFERENCE TO RELATED APPLICATIONS

The present Application for Patent is a continuation-in-part of application Ser. No. 11/317,632, filed Dec. 22, 2005, now pending, which is a continuation-in-part of application Ser. No. 10/190,015, filed Jul. 8, 2002, now U.S. Pat. No. 7,035,112, both of which are incorporated by reference herein.

FIELD OF THE INVENTION

The present invention relates to a switch device, and more particularly, to a KVM switch device.

BACKGROUND

The present invention relates to an automatic switch for a user to automatically switch between two or more computers, and, more particularly, to an improved keyboard, video and mouse (KVM) switch that has an integrally injection-molded cables to provide good weather-resistance, impact-resistance, and absolute protection of an internal circuit board thereof.

Computers are becoming more prevalent in both homes and offices, and are often considered requisite "tools" for work, learning, leisure activities, and daily life. In certain environments, a user needs to be able to access to multiple computers simultaneously. For example, a user may have a computer dedicated to work, such as a computer used for stock trading; as well as a second computer limited to non-work activities, such as a computer used for browsing the World-Wide-Web and playing video games. Currently, for users who need to access two or more computers simultaneously, instead of using a separate keyboard, monitor and mouse for each computer, an automatic switching device commonly referred to as a Keyboard, Video and Mouse (KVM) switch is used. The KVM switch allows the user to use one keyboard, monitor and mouse to control two or more computers by being able to switch among them.

Typically, the KVM switch contains a circuit that provides the functionality for switching a set of keyboard, mouse and monitor among different computers. Thus, one set of signal cables are run from a keyboard (keyboard signal cable), a mouse (mouse signal cable) and a monitor (video signal cable) to the KVM switch, and, to each computer, another set of keyboard, mouse and monitor signals cables are run from the KVM switch. Thus, if the KVM switch is connected to 2 computers, 2 separate sets of cables, each set having a keyboard signal cable, a mouse signal cable, and a video signal cable, are needed. With the number of cables running from the KVM switch increasing incrementally based on the number of computers connected, cable management becomes a problem. Further, as the number of cables increases, the likelihood that the cables may become loose and disconnected from the KVM switch also increases. Another issue is the confusion on the part of the user of which cables to purchase because many KVM switches have multiple outlets for connecting to different types of peripherals.

SUMMARY OF THE PREFERRED EMBODIMENTS

In one preferred embodiment of the present invention, a keyboard, video and mouse (KVM) switch comprises an enclosure; a switching circuit contained within the enclosure; a set of connector ports disposed on the enclosure and electrically coupled to the switching circuit; a set of plugs electrically coupled to the switching circuit, the set of plugs comprising: a video plug disposed on the enclosure for directly coupling to a video port of a first computer system; and at least one peripheral plug attached to the enclosure for coupling to at least one peripheral port of the first computer system; and a cable connector electrically coupled to the switching circuit, for coupling to a second computer system via a detachable cable; wherein the switching circuit switches to operatively couple each connector port to the set of plugs and the cable connector.

In another preferred embodiment of the present invention, a keyboard, video and mouse (KVM) switch comprises an enclosure; a switching circuit contained within the enclosure; a set of connector ports disposed on the enclosure and electrically coupled to the switching circuit; a set of plugs electrically coupled to the switching circuit, the set of plugs comprising: a video plug disposed on the enclosure for directly coupling to a video port of a first computer system; and at least one peripheral plug attached to the enclosure for coupling to at least one peripheral port of the first computer system; and at least one cable, including a plurality of connector plugs, integrated into the enclosure and electrically coupled to the switching circuit; wherein the switching circuit switches to operatively couple each connector port to the set of plugs and the cable connector.

In another preferred embodiment of the present invention, a computer peripherals switch comprising : a switching circuit contained within a body; a plurality of computer peripheral ports electrically coupled to the switching circuit and disposed on the body, for coupling to peripherals to be shared; at least one peripheral plug disposed on the body and electrically coupled to the switching circuit, for coupling the switching circuit to a first computer system; and a cable with a plurality of connectors electrically coupled to the switching circuit and integrally attached to the body, for coupling the switching circuit to a second computer system; wherein the peripheral plug is capable of coupling directly to the first computer system without an additional cable.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
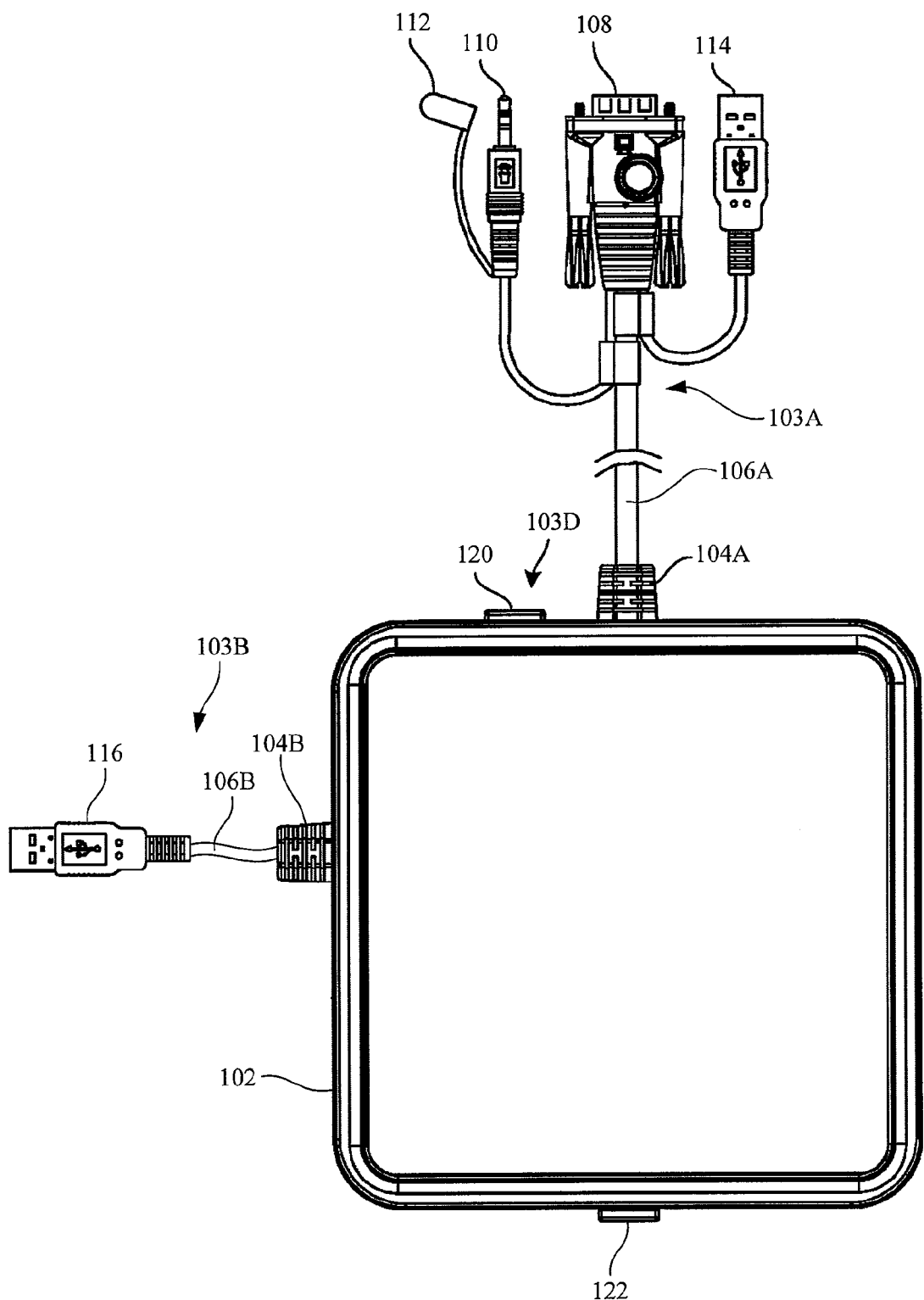
FIG. 1 is a top plan view of a keyboard, video and mouse (KVM) switch configured in accordance with one preferred embodiment of the present invention.

FIG. 1 illustrates a Keyboard, Video and Mouse (KVM) switch device 100 configured in accordance with one preferred embodiment of the present invention. KVM switch device 100 includes a body 102, from which a first interface 103A and a second interface 103B extends. In one preferred embodiment, first interface 103A and second interface 103B includes a first cable 106A and a second cable 106B, respectively, integrated into body 102. Each cable is attached to body via a strain relief. First cable 106A and second cable 106B are permanently attached to body 102 via strain relief 104A and 104B, respectively. In one preferred embodiment, first cable 106A and second cable 106B are integrally formed (e.g., molded) with body 102, such that the cables are sealed to the body.

Extending from cable 106A is a plurality of connector plugs having an audio plug 110 with a plug cover 112, a video plug 108 and at least one peripheral plug 114. Extending from cable 106B is a peripheral plug 116. In one preferred embodiment, the peripheral plugs 114 and 116 are compatible for mating with a Universal Serial Bus (USB) standard device. In other preferred embodiments, peripheral plug is compatible for mating with other peripheral standards, such as the PS/2, audio or IEEE1394. Moreover, a video plug 122 is disposed on body 102. In one embodiment, the video plug 122 is a female VGA connector which can be directly coupled to the VGA port of a computer. Other video plug such as DVI connector or HDMI connector may also be utilized to meet different requirements. According to the present invention, the set of plugs of the video plug 122 and the peripheral plug 116 are coupled to the same computer.

On the other hand, additional interface 103D is also disposed on body 102. In one preferred embodiment, interface 103D includes a cable connector 120. The cable connector 120 is configured to be connected to a detachable cable that contains a plurality of connector plugs such as audio plugs, video plugs, and peripheral plugs similar to the plugs on cable 106A. In another preferred embodiment, the detachable cable may contain a different number of plugs as compared to first cable 106A. For example, the detachable cable may only contain a video plug and one peripheral plug.

Figure 2:
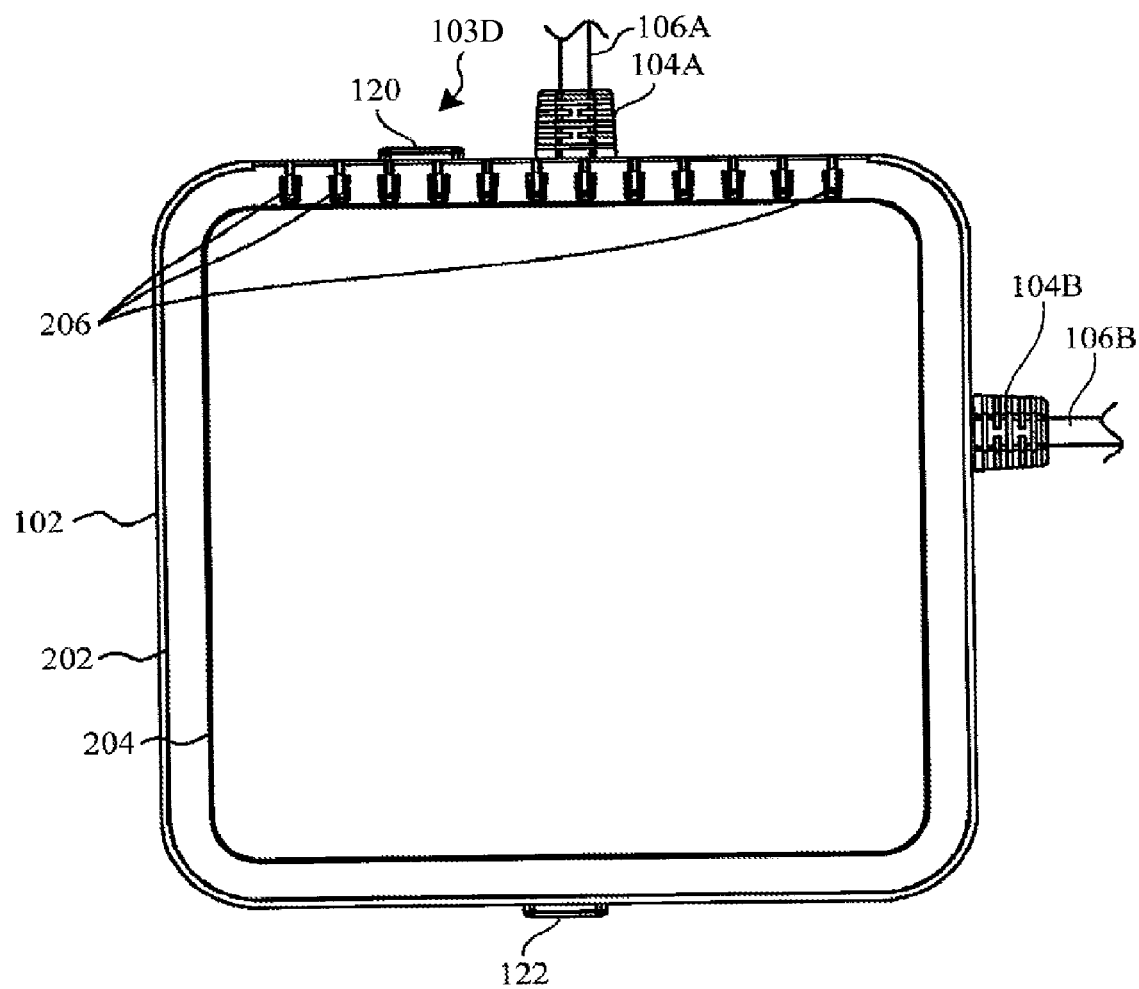
FIG. 2 is a bottom plan view of the keyboard, video and mouse (KVM) switch of FIG. 1.

FIG. 2 illustrates a bottom plan view of KVM switch device 100 having a bottom side 202 includes a padding 204 and a plurality of vent slots 206. In one preferred embodiment, padding 204 is comprised of a material that provides for non-slip capabilities. In one preferred embodiment, materials that may be used include rubber-based compounds or polymers. In another preferred embodiment, material such as cloth may be used.

Figure 3:
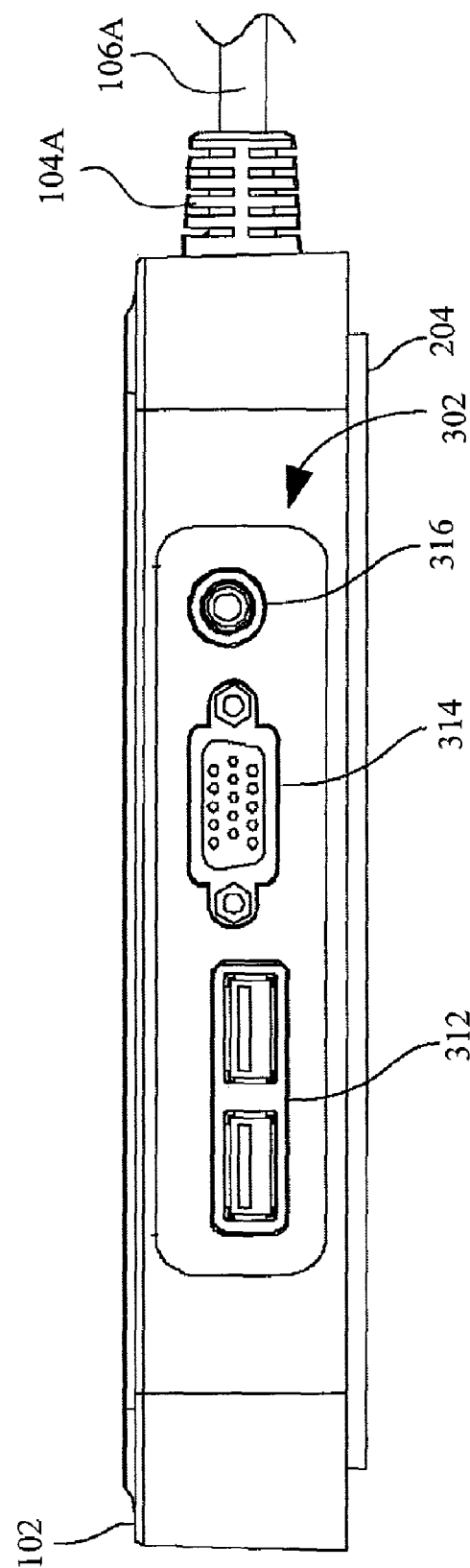
FIG. 3 is a right elevation view of the keyboard, video and mouse (KVM) switch of FIG. 1.

FIG. 3 illustrates a view of the right side of KVM switch device 100 having a plurality of computer peripheral connector ports 302 including a pair of peripheral ports 312, a video port 314, and an audio port 316. In one preferred embodiment, pair of peripheral ports 312 is similar to peripheral plug 114, such that the computer peripheral communication standard with which pair of peripheral ports 312 is compatible is the same standard with which peripheral plug 114 is compatible. For example, pair of peripheral ports 312 and peripheral plug 114 are compatible with the USB standard. In another preferred embodiment, pair of peripheral ports 312 and peripheral plug 114 are compatible with different computer peripheral interconnection standards and KVM switch device 100 needs to perform certain translations of the signals going to and from the computer peripherals coupled to the plug/ports, as further discussed below.

Figure 4:
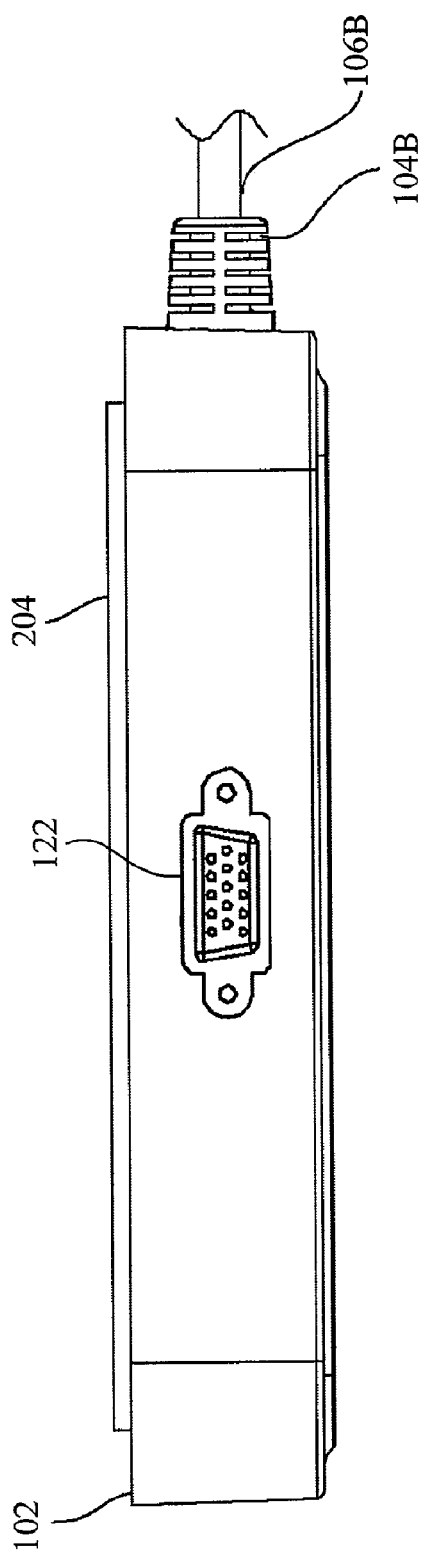
FIG. 4 is a front elevation view of the keyboard, video and mouse (KVM) switch of FIG. 1.

FIG. 4 is a view of the front of KVM switch device 100, where a video plug 122 is disposed on body 102 and is integrated into body 102. According to the present invention, the set of plugs of the video plug 122 and the peripheral plug 116 are coupling to the same computer.

Figure 5:
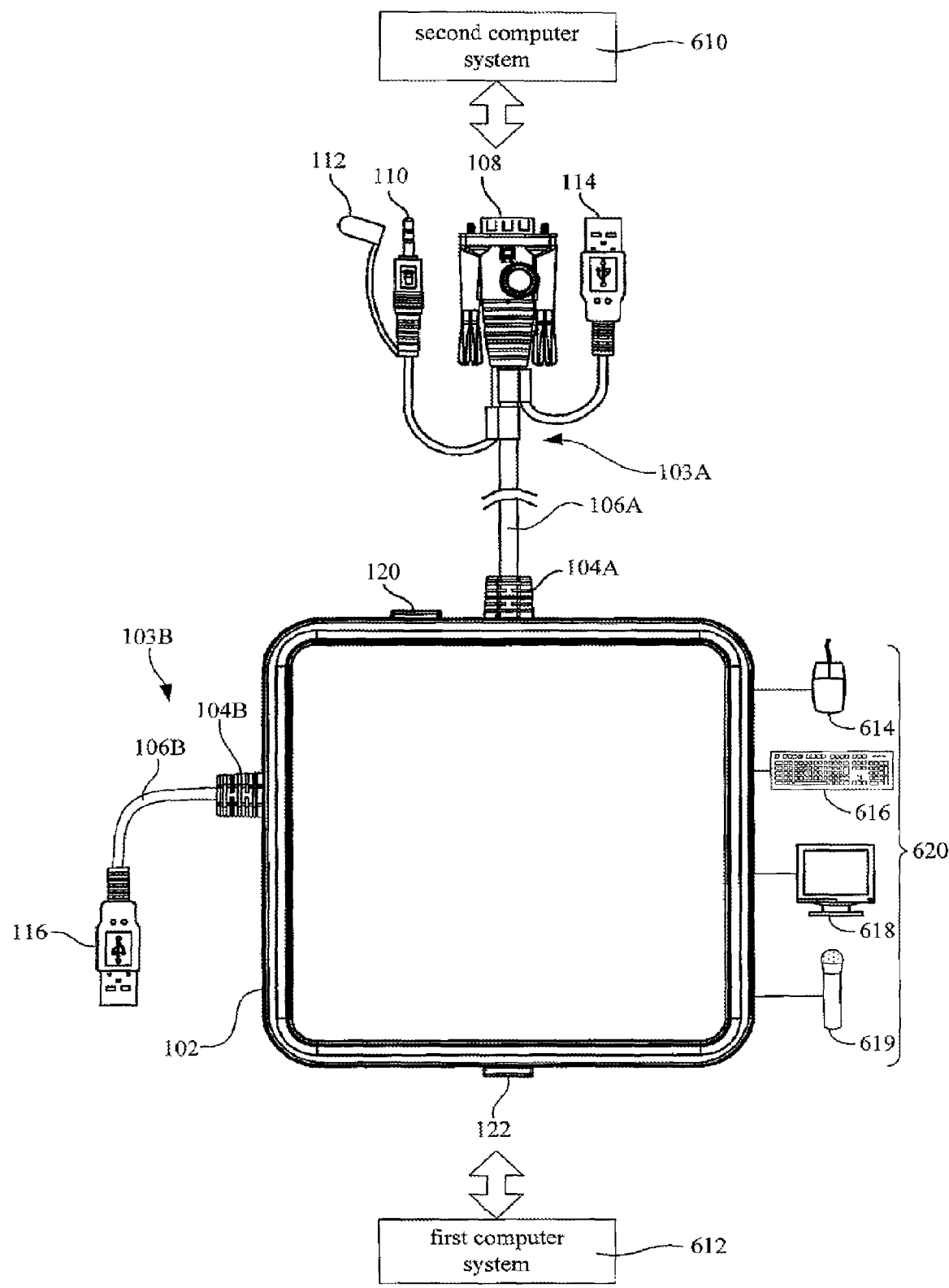
FIG. 5 illustrates an example of the keyboard, video and mouse (KVM) switch of FIG. 1 is used to couple with two computers..

FIG. 5 illustrates an example of the KVM switch 100 which is used to couple with two computers. Second computer system 610 and first computer system 612 are general purpose computer systems. KVM switch device 100 is use to allow a single set of peripherals 620, such as a display device 614, an alphanumeric input device 616, a cursor control device 618 and audio device 619, i.e., a console, to be selectively coupled to second computer system 610 or first computer system 612. In this embodiment, the second computer system 610 is connected to the plugs of first cable 106A. The second compute system 610 is connected to the video plug 122 and the peripheral plug 116. The second computer system 610 and the first computer system 612 are selectively connected to the computer peripherals 620 that are coupled to KVM switch device 100. In another embodiment, the second computer system 610 or a third computer system may also be coupled with a detachable cable that is connected to the interface 103D. In one exemplary configuration, the second computer system 610 is coupled to display device 618 using video plug 108, coupled to alphanumeric input device 616 and cursor control device 614 using peripheral plug 114 and coupled to audio device 619 using audio plug 110 on first cable 106A. The first computer system 612 is coupled to display device 618 using video plug 122 disposed on KVM switch device 100 and coupled to an alphanumeric input device 616 and cursor control device 614 using peripheral plug 116 on second cable 106B. On the other embodiment, an audio plug also may be integrated into the second cable 106B. In this case, the first computer system 612 is coupled to the audio device 619 using this audio plug. By switching the KVM switch device 100, a user may determine to control the second computer system 610 or the first computer system 612 using the peripherals 620.

In a preferred embodiment, display device 618 is coupled to the video port 314 on KVM switch device 100. The display device 618 is a device, such as a cathode ray tube (CRT) or a liquid crystal display (LCD), used for displaying information to a user so that, for example, graphical or textual information may be presented to the user. The alphanumeric input device 616, including alphanumeric and other keys, is coupled to one of the ports of pair of peripheral ports 312 on KVM switch device 100 for communicating information and/or user selection commands to processor of second computer system 610 or first computer system 612. The cursor control device 614 is plugged into another port of pair of peripheral ports 312 on KVM switch device 100. The cursor control device 614 is, such as a conventional mouse, touch mouse, trackball, touchpad or other type of cursor direction keys for communicating direction information and command selection to second computer system 610 or first computer system 612. Various other types of input devices, including, but not limited to the input devices described herein, may be coupled to KVM switch device 100 using pair of peripheral ports 312 to allow the user to provide command or input to second computer system 610 or first computer system 612.

Accordingly, according to the present invention, a video plug 122 is directly disposed on the KVM switch device 100 to be connected with the first computer system 612. Therefore, it is not necessary to use an additional cable to extend the video plug 122 such that the cost of the cable is saved.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A keyboard, video and mouse (KVM) switch comprising:
   an enclosure;
   a switching circuit contained within the enclosure;
   a set of connector ports disposed on the enclosure and electrically coupled to the switching circuit;
   a set of plugs electrically coupled to the switching circuit and permanently attached to the enclosure, the set of plugs comprising:
      a video plug disposed on the enclosure for directly coupling to a video port of a first computer system; and
      at least one peripheral plug attached to the enclosure for coupling to at least one peripheral port of the first computer system; and
   a cable connector electrically coupled to the switching circuit, for coupling to a second computer system via a detachable cable;
   wherein the switching circuit switches to operatively couple each connector port to the set of plugs and the cable connector.

2. The KVM switch of claim 1, wherein each connector port is selected from the group consisting of a VGA port, a DVI port, a HDMI port, an USB port, an IEEE1394 port, a PS/2 port and an audio port.

3. The KVM switch of claim 1, wherein the video plug is selected from the group consisting of a VGA connector, a DVI connector and a HDMI connector.

4. The KVM switch of claim 1, wherein the peripheral plug is attached to the enclosure through a peripheral cable.

5. The KVM switch of claim 1, wherein the peripheral plug is selected from the group consisting of an USB connector, an IEEE1394 connector, a PS/2 connector and an audio connector and any combination thereof.

6. The KVM switch of claim 1, wherein one end of the detachable cable comprises a plurality of connectors selecting from the group consisting of a VGA connector, a DVI connector, a HDMI connector, an USB connector, an IEEE1394 connector, a PS/2 connector and an audio connector.

7. The KVM switch of claim 1, further comprising:
   at least one cable integrated into the enclosure and electrically coupled to the switching circuit, for coupling to a third computer system;
   wherein the switching circuit further switches to operatively couple each connector port to the set of plugs, the cable connector and the cable.

8. The KVM switch of claim 7, wherein the cable comprises a plurality of connector plugs.

9. The KVM switch of claim 8, wherein the connector plugs of the cable are selected from the group consisting of a VGA connector, a DVI connector, a HDMI connector, an USB connector, an IEEE1394 connector, a PS/2 connector and an audio connector.

10. The KVM switch of claim 7, wherein the cable is fixedly attached to the enclosure through a molded attachment element.

11. The KVM switch claim 1, wherein the set of plugs are permanently attached to the enclosure via a strain relief.

12. A keyboard, video and mouse (KVM) switch comprising:
    an enclosure;
    a switching circuit contained within the enclosure;
    a set of connector ports disposed on the enclosure and electrically coupled to the switching circuit;
    a set of plugs electrically coupled to the switching circuit, the set of plugs comprising:
       a video plug disposed on the enclosure for directly coupling to a video port of a first computer system; and
       at least one peripheral plug attached to the enclosure for coupling to at least one peripheral port of the first computer system; and
    at least one cable, including a plurality of connector plugs, integrated into the enclosure and electrically coupled to the switching circuit;
    wherein the switching circuit switches to operatively couple each connector port to the set of plugs and the plurality of connector plugs.

13. The KVM switch of claim 12, wherein each connector port is selected from the group consisting of a VGA port, a DVI port, a HDMI port, an USB port, an IEEE1394 port, a PS/2 port and an audio port.

14. The KVM switch of claim 12, wherein the video plug is selected from the group consisting of a VGA connector, a DVI connector and a HDMI connector.

15. The KVM switch of claim 12, wherein the peripheral plug is attached to the enclosure through a peripheral cable.

16. The KVM switch of claim 12, wherein the peripheral plug is selected from the group consisting of an USB connector, an IEEE1394 connector, a PS/2 connector and an audio connector.

17. The KVM switch of claim 12, wherein the cable is fixedly attached to the enclosure through a molded attachment element.

18. The KVM switch of claim 12, wherein the connector plugs of the cable are selected from the group consisting of a VGA connector, a DVI connector, a HDMI connector, an USB connector, an IEEE1394 connector, a PS/2 connector and an audio connector.

19. The KVM switch of claim 12, wherein the set of plugs are permanently attached to the enclosure via a strain relief.

20. A computer peripherals switch comprising:
    a switching circuit contained within a body;
    a plurality of computer peripheral ports electrically coupled to the switching circuit and disposed on the body, for coupling to peripherals to be shared;
    at least one peripheral plug disposed on the body and electrically coupled to the switching circuit, for coupling the switching circuit to a first computer system; and
    a cable with a plurality of connectors electrically coupled to the switching circuit and integrally attached to the body, for coupling the switching circuit to a second computer system;
    wherein the peripheral plug is coupled directly to the first computer system without an additional cable.

21. The computer peripherals switch of claim 20, wherein the peripheral plug and the connectors are selected from the group consisting of a VGA connector, a DVI connector, a HDMI connector, an USB connector, an IEEE1394 connector, a PS/2 connector and an audio connector.

22. The computer peripherals switch of claim 20, wherein the peripheral plug is permanently attached to the enclosure via a strain relief.

* * * * *